United States Patent

Babu et al.

[11] Patent Number: 5,827,488
[45] Date of Patent: *Oct. 27, 1998

[54] PROCESS FOR REMOVING $SO_2$ AND $NO_X$ FROM A GASEOUS STREAM

[75] Inventors: Manyam Babu, Upper St. Clair; John W. College, Pittsburgh, both of Pa.

[73] Assignee: Dravo Lime Company, Pittsburgh, Pa.

[*] Notice: The term of this patent shall not extend beyond the expiration date of Pat. No. 5,817,283.

[21] Appl. No.: 706,657

[22] Filed: Sep. 6, 1996

[51] Int. Cl.$^6$ .......................... B01J 19/08; B01D 53/50; B01D 53/56
[52] U.S. Cl. .................... 423/235; 423/243.08; 423/395; 423/519.2; 204/177
[58] Field of Search .............................. 423/393, 243.08, 423/235, 395, 519.2; 204/157.3, 157.46, 177, 910, 911; 95/69, 70; 96/55, 57

[56] References Cited

U.S. PATENT DOCUMENTS

| 807,491 | 12/1905 | Pauling | 204/177 |
|---|---|---|---|
| 3,919,393 | 11/1975 | Selmeczi | 423/242 |
| 3,919,394 | 11/1975 | Selmeczi | 423/242 |
| 4,367,211 | 1/1983 | Ray | 423/569 |
| 4,645,652 | 2/1987 | Kimura | 423/235 |
| 4,650,555 | 3/1987 | Rzad et al. | 204/174 |
| 4,657,738 | 4/1987 | Kanter et al. | 422/186.04 |
| 4,695,358 | 9/1987 | Mizuno et al. | 204/174 |
| 4,996,032 | 2/1991 | Stowe, Jr. et al. | 423/242 |
| 5,039,499 | 8/1991 | Stowe, Jr. | 423/242 |
| 5,147,516 | 9/1992 | Mathur et al. | 204/177 |
| 5,240,575 | 8/1993 | Mathur et al. | 204/177 |
| 5,284,557 | 2/1994 | Ukawa et al. | 204/130 |
| 5,458,748 | 10/1995 | Breault et al. | 204/177 |
| 5,695,616 | 12/1997 | Helfritch et al. | 204/157.3 |

FOREIGN PATENT DOCUMENTS

| 0 158 823 A2 | 10/1985 | European Pat. Off. | 423/235 |
|---|---|---|---|
| 0640377 A2 | 3/1995 | European Pat. Off. | |
| 3412955 | 10/1985 | Germany . | |
| 51-34868 | 3/1976 | Japan | 423/235 |
| 57-56084 A | 4/1982 | Japan | 423/243.08 |

OTHER PUBLICATIONS

Patent Abstracts of Japan, vol. 096, No. 010, 31 Oct. 1996 For JP 08 155264 (Mitsui Eng. & AMP Shipbuild Co. Ltd.), 18 Jun. 1996, Abstract.
Database WPI, Section Ch, Week 9637, Derwent Publications Ltd, London, GB; Class E36, AN 96–366096 For JP 08 173 752 A (Hitachi Plant Eng & Constr Co.), 9 Jul. 1996, * abstract *.
Database WPI, Section Ch, Week 9612, Derwent Publications Ltd., London, GB; Class E36, An 96–110812 For JP 08 010 564 A (Mitsui Eng & Shipbuilding Co.), 16 Jan. 1996, * abstract *.
Kohl et al. "Gas Purification" 4th Edition, Gulf Publishing Co. Houston TX USA, ISBN 0–87201–314–6 pp. 334–338, No Month 1985.

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

A process for removing both sulfur dioxide and nitrogen oxides from a gaseous stream where the stream is contacted in a first wet scrubbing unit with an alkaline earth compound to remove sulfur dioxide and humidify the gaseous stream, passing of the humidified gaseous stream to a coronal discharge unit to convert $NO_x$ therein to nitric acid, and then contacting the gaseous stream to a second wet scrubbing unit and contacting the gaseous stream with an alkaline earth compound to remove the nitric acid as an alkaline earth nitrate prior to discharge of the gaseous stream to the atmosphere. The effluent from the first wet scrubbing unit is maintained separate from the effluent from the second wet scrubbing unit during the removal steps so as to provide pure recoverable by-products.

8 Claims, 1 Drawing Sheet

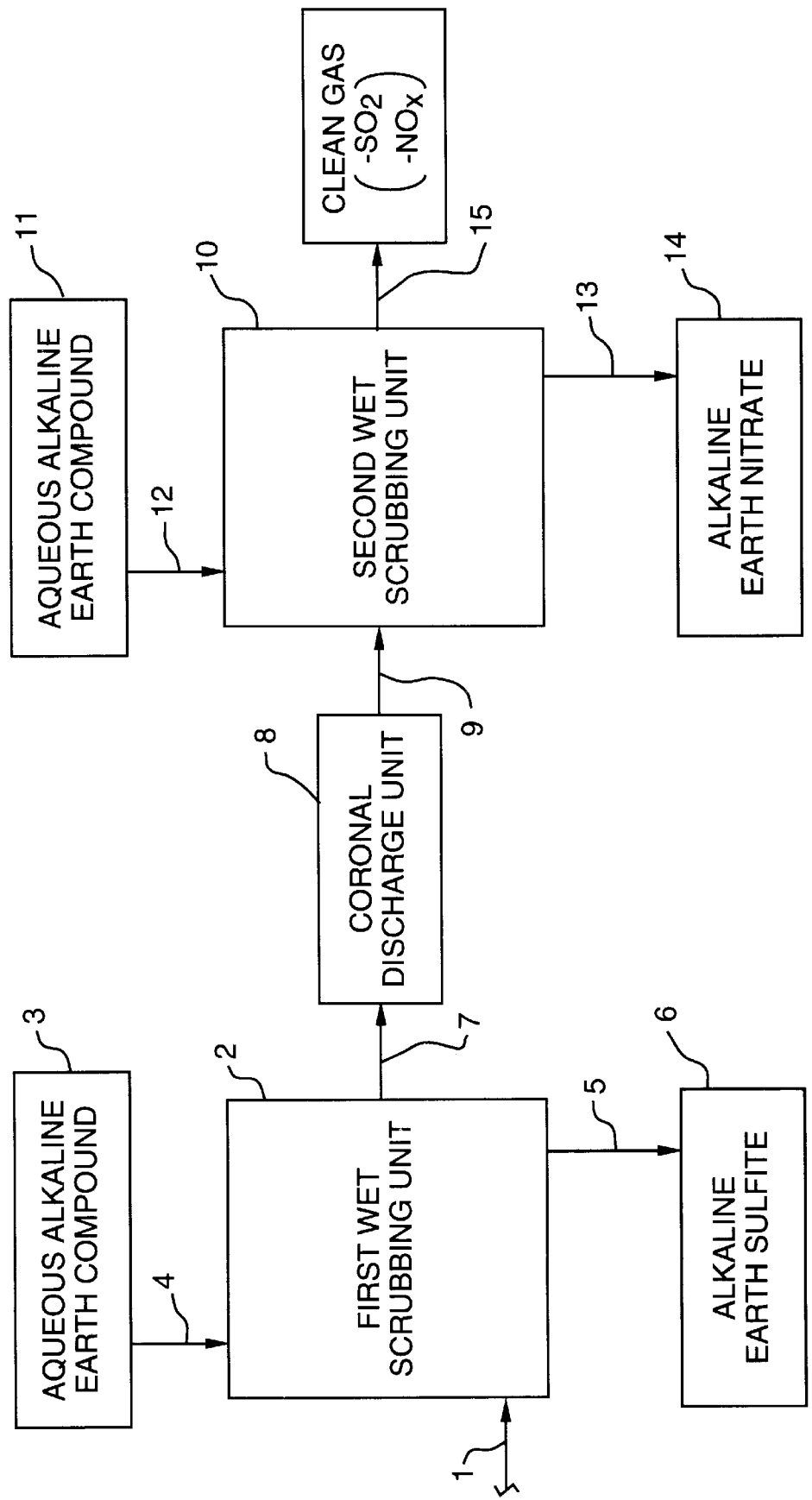

PROCESS FOR REMOVING SO₂ AND NOₓ FROM A GASEOUS STREAM

PROCESS FOR REMOVING $SO_2$ AND $NO_X$ FROM A GASEOUS STREAM

FIELD OF THE INVENTION

The present invention is a process for the combined removal of sulfur dioxide and nitrogen oxides from a gaseous stream, such as a gas resulting from the combustion of fossil fuels, using wet scrubbing systems.

BACKGROUND OF THE INVENTION

In order to protect the environment from the acidic affects of sulfur dioxide and nitrogen oxides that result in gases during the combustion of fossil fuels, such as in production of electrical power, it is necessary to remove both sulfur dioxide and nitrogen oxides from the gaseous stream produced prior to discharge of the gaseous stream to the atmosphere.

Various methods have been proposed for removing sulfur dioxide from such gaseous streams using either dry injection or wet scrubbing of the gases. Wet scrubbing processes can use aqueous slurries or solutions of alkaline earth compounds, such as calcium carbonate, calcium hydroxide or magnesium hydroxide, such as for example are described in U.S. Pat. No. 3,919,393, U.S. Pat. No. 3,919,394, U.S. Pat. No. 4,996,032 and U.S. Pat. No. 5,039,499, all of which are assigned to the assignee of the present invention.

The removal of nitrogen oxides from such a gaseous stream are usually grouped into two groups, the selective catalytic reduction (SCR) processes or the selective non-catalytic reduction processes (SNCR). Problems exist with the SCR nitrogen oxide removal processes in that the processes consume a reagent and a catalyst bed, the catalyst being very expensive and subject to deterioration. Common reagents used in SCR processes are ammonia and urea which, in the presence of a catalyst convert NO to $N_2$ and $H_2O$. By-products produced, such as ammonium sulfate and ammonium chloride give negative results in that ammonium sulfate is sticky and has a tendency to foul air preheaters reducing the efficiency of a boiler, while ammonium chloride exits a stack as a particulate material. SCR processes are also hot side processes. The SNCR nitrogen oxide removal processes use reagents that are injected into the gaseous stream at elevated temperatures to reduce NO to $N_2$. These reagents, such as ammonia or urea are expensive and produce the same by-products as the SCR processes with their attendant disadvantages. The SNCR technology is generally expected to allow 30–50% removal of nitrogen oxides before chemical problems occur downstream of the injection point. The SNCR process is also a hot side process. Both the SCR and SNCR processes require sulfur dioxide removal downstream from the nitrogen oxide removal system, and neither process is very useful with high sulfur content coal combustion gases.

It is an object of the present invention to provide a process for the combined removal of sulfur dioxide and nitrogen oxides from a gaseous stream using wet scrubbers where the resultant sulfur by-products and nitrogen by-products are maintained separate so as to provide priority of these distinct byproducts.

SUMMARY OF THE INVENTION

A combustion gas stream resulting from combustion of a fossil fuel is treated to remove both sulfur dioxide and nitrogen oxides. The gaseous stream is first contacted in a first wet scrubbing unit with a first aqueous medium that contains an alkaline earth compound, such as calcium hydroxide or magnesium hydroxide, which reacts with the sulfur dioxide to form an alkaline earth sulfite while the aqueous medium also humidifies the gaseous stream. The alkaline earth sulfites are removed from the first wet scrubbing unit and the humidified gaseous stream is discharged from the first wet scrubbing unit, with sulfur dioxide having been removed therefrom, and is exposed to a coronal discharge. The coronal discharge produces nitric acid from the nitrogen oxides present in the humidified gaseous stream, and the gaseous stream is now contacted in a second wet scrubbing unit with a second aqueous medium containing an alkaline earth compound, such as calcium hydroxide or magnesium hydroxide, which reacts with the nitric acid to form an alkaline earth nitrate. The alkaline earth nitrates are removed from the second wet scrubbing unit and the gaseous stream which has now had both sulfur dioxide and nitrogen oxides removed therefrom may be discharge to the atmosphere. It is important in the present process that the alkaline earth sulfites from the first scrubbing unit be maintained separate from the alkaline earth nitrates from the second wet scrubbing unit during the removal steps so as to maintain purity of the two wet scrubbing unit discharges.

BRIEF DESCRIPTION OF THE DRAWING

The present invention will be more readily apparent from the following description of a preferred embodiment shown, by way of example only, in the accompanying drawing which is a flow diagram of the presently preferred process of the present invention.

DETAILED DESCRIPTION

In the present process, a gaseous stream containing sulfur dioxide gas and $NO_x$ gases is passed to a first wet scrubbing unit and contacted with an aqueous medium containing an alkaline earth compound which reacts with the sulfur dioxide to form an alkaline earth sulfite. The alkaline earth compound may be limestone in an aqueous slurry, lime or magnesium-enhanced lime as an aqueous slurry, such as described in U.S. Pat. No. 3,919,393 and U.S. Pat. No. 3,919,394, or an aqueous solution or suspension of magnesium hydroxide, such as is described in U.S. Pat. No. 4,996,032 and U.S. Pat. No. 5,039,499. Where limestone or lime are present, calcium sulfite along with calcium bisulfite will be formed, while when magnesium hydroxide is present, magnesium sulfite along with magnesium bisulfite will be formed by reaction with, and removal of, sulfur dioxide from the gaseous stream. The aqueous-medium containing an alkaline earth compound is generally recycled through the wet scrubbing unit through which the gaseous stream is passed, and a bleed stream of a first aqueous effluent containing the produced alkaline earth sulfite is removed, preferably with later treatment of the alkaline earth sulfite effected to produce the desired by-products. Where calcium sulfite is produced, for example, the same may be oxidized to produce gypsum, or where magnesium sulfite is produced, the same may be used to produce magnesium hydroxide or magnesium oxide. In addition to removal of sulfur dioxide, the aqueous scrubbing medium containing the alkaline earth compound will also remove chlorine from the gaseous stream.

During contact of the gaseous stream with the aqueous medium containing an alkaline earth compound in the first wet scrubbing unit, the gaseous stream will pick up water so as to become substantially saturated with moisture. The humidified gaseous stream, after removal of sulfur dioxide and chlorides therefrom, but still containing $NO_x$ components, is separated from the first wet scrubbing unit and is passed through a coronal discharge unit where the gas is exposed to a coronal discharge. The exposure of the humidified gaseous stream to a coronal discharge effects a reaction of $NO_x$ compounds to produce nitric acid which is entrained in the gaseous stream. The formation of nitric acid by use of a coronal discharge is believed to follow the following reaction sequence:

Production of oxidizing species by coronal discharge;

Production of nitric acid;

While various coronal discharge systems may be used in the present process, an especially useful system is that described in U.S. Pat. No. 5,458,748, the contents of said patent being incorporated by reference herein. The system described in that patent uses a sulfur tolerant, high water vapor tolerant, packing free coronal catalyst, and optionally suggests the use of downstream scrubbers of wet or dry configuration to absorb particular $NO_x$ reduction products $NO_2$ and $HNO_3$, upon exposure to an arresting agent, including basic, caustic, or alkali materials such as CaO or $NH_3$.

After exposing the humidified gas to a coronal discharge, the gas stream containing entrained nitric acid is contacted in a second wet scrubbing unit with a second aqueous medium containing an alkaline earth compound, such as calcium hydroxide or magnesium hydroxide, which reacts with nitric acid to form an alkaline earth nitrate, such as by the reactions:

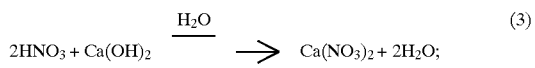

After contact of the humidified gas in the second wet scrubbing unit with the second aqueous medium containing an alkaline earth compound, such as calcium hydroxide or magnesium hydroxide, which reacts with the nitric to form an alkaline earth nitrate, the gas, which has had both sulfur dioxide and nitrogen oxides removed therefrom, is separated and discharged, while a second aqueous effluent containing the alkaline earth nitrate is removed from the second wet scrubbing unit.

In accordance with the present process, it is important that the first aqueous effluent containing alkaline earth sulfites be removed from the first wet scrubbing unit separately and distinct from the second aqueous effluent containing alkaline earth nitrates removed from the second wet scrubbing unit, such that the integrity of the by-products produced is maintained.

With use of the present process, where the sulfur dioxide and chlorides are removed in a first wet scrubbing unit, about 99 percent of the sulfur dioxide and chlorides can be removed from the gaseous stream prior to the coronal discharge treatment and removal of nitric acid from the gaseous stream such that pure by-products, such as calcium nitrate or magnesium nitrate, result in the effluent from the second wet scrubbing unit.

Referring now to the drawing which schematically illustrates the present preferred process, a gaseous stream from line 1, containing sulfur dioxide and nitrogen oxides, is charged to a first wet scrubbing unit 2. In the first wet scrubbing unit 2, the gaseous stream is contacted with an aqueous medium containing an alkaline earth compound, such as a lime slurry or solution of magnesium hydroxide, fed from a source 3 through line 4 which reacts with sulfur dioxide to form an alkaline earth sulfite, such as calcium sulfite or magnesium sulfite, that is discharged through line 5 to a collection vessel 6.

The gaseous stream, with sulfur dioxide removal therefrom and being humidified to substantially complete saturation by contact with the aqueous medium in first wet scrubbing unit 2 is discharge through line 7 and passed to a coronal discharge unit 8. In the coronal discharge unit, the humidified gaseous stream, containing nitrogen oxides, is exposed to a coronal discharge and the nitrogen oxides converted to nitric acid. The humidified gaseous stream, now containing nitric acid, and having the sulfur dioxide previously removed, is then passed through line 9 to a second wet scrubbing unit 10. In the second wet scrubbing unit 10, the humidified gaseous stream is contacted with an aqueous medium containing an alkaline earth compound, such as a lime slurry or magnesium hydroxide, fed from a source 11 through line 12, which reacts with the nitric acid to form an alkaline earth nitrate, such as calcium nitrate or magnesium nitrate, that is discharged through line 13 to a collection vessel 14. The gaseous stream which has now had both sulfur dioxide and nitrogen oxides removed therefrom is discharged from the second wet scrubbing unit 10 through line 15. As illustrated, the alkaline earth sulfites that are formed in the first wet scrubbing unit 2 and the alkaline earth nitrates that are formed in the second wet scrubbing unit 10 are maintained separate from each other such that one will not contaminate the other.

In the present process, the first wet scrubbing unit may be a vertical or horizontal scrubbing unit, with the gases passed either vertically or horizontally through a wet scrubbing device to remove sulfur dioxide therefrom, with the coronal discharge unit also arranged to treat the gases and convert $NO_x$ gases to nitric acid during either vertical or horizontal flow therethrough. Also, the second wet scrubbing unit may be a vertical or horizontal scrubbing unit with the gases passed either vertically or horizontally through a wet scrubbing device to remove nitric acid therefrom. Thus, for example, the entire system used to carry out the present process can be laid out in a horizontal alignment or any other alignment which is advantageous in retrofitting existing scrubbing systems.

The present process is especially useful in systems where higher gas velocities are present and can be operated not only at low gas velocities such as velocities of 10 feet/second but also at higher gas velocities of about 20–25 feet/second or higher. The present process also uses less expensive reagents than the SCR or SNCR processes by avoiding the need for ammonia or urea and operates downstream of all heat recovery systems in a boiler unit and thus does not affect a plant's heat rate. Expensive catalysts are also not required along with normal plugging problems associated therewith. The present process is also readily adapted for use as a retrofit for existing wet scrubbing systems for sulfur dioxide removal using lime or magnesium hydroxide as the sulfur dioxide removal reagent.

The present process also provides the by-product from the $NO_x$ removal step in a form that is economically advantageous. The by-products produced by the wet scrubbing of the coronal discharge unit are either calcium nitrate or magnesium nitrate, both valuable compounds usable as a fertilizer component or for other uses.

What is claimed is:

1. A process for removing sulfur dioxide and $NO_x$ from a gaseous stream comprising:

contacting said gaseous stream in a first wet scrubbing unit with a first aqueous medium, containing an alkaline earth compound, which reacts with sulfur dioxide to form an alkaline earth sulfite and humidifies said gaseous stream to substantial saturation;

separating said humidified gaseous stream from said first wet scrubbing unit and removing a first aqueous effluent containing an alkaline earth sulfite from said first wet scrubbing unit;

exposing said separated humidified gaseous stream containing $NO_x$ to a coronal discharge to form nitric acid in said humidified gaseous stream;

contacting said humidified gaseous stream containing nitric acid in a second wet scrubbing unit with a second aqueous medium containing an alkaline earth compound which reacts with nitric acid to form an alkaline earth nitrate;

separating said humidified gaseous stream from said second wet scrubbing unit and removing a second aqueous effluent containing an alkaline earth nitrate from said second wet scrubbing unit; and maintaining the first aqueous effluent from said first wet scrubbing unit separate from the second aqueous effluent from said second wet scrubbing unit during said removing steps.

2. The process for removing sulfur dioxide and $NO_x$ from a gaseous stream as defined in claim 1 wherein said first aqueous medium contains an alkaline earth compound selected from the group consisting of calcium hydroxide and magnesium hydroxide.

3. The process for removing sulfur dioxide and $NO_x$ from a gaseous stream as defined in claim 1 wherein said alkaline earth sulfite is selected from the group consisting of calcium sulfite and magnesium sulfite.

4. The process for removing sulfur dioxide and $NO_x$ from a gaseous stream as defined in claim 1 wherein said second aqueous medium contains an alkaline earth compound selected from the group consisting of calcium hydroxide and magnesium hydroxide.

5. The process for removing sulfur dioxide and $NO_x$ from a gaseous stream as defined in claim 1 wherein said alkaline earth nitrate is selected from the group consisting of calcium nitrate and magnesium nitrate.

6. A process for removing sulfur dioxide and $NO_x$ from a gaseous stream comprising:

contacting said gaseous stream in a first wet scrubbing unit with a first aqueous medium, containing an alkaline earth compound selected from the group consisting of calcium hydroxide and magnesium hydroxide, which reacts with sulfur dioxide to form an alkaline earth sulfite and humidifies said gaseous stream to substantial saturation;

separating said humidified gaseous stream from said first wet scrubbing unit and removing a first aqueous effluent containing an alkaline earth sulfite from said first wet scrubbing unit;

exposing said separated humidified gaseous stream containing $NO_x$ to a coronal discharge to form nitric acid in said humidified gaseous stream;

contacting said humidified gaseous stream containing nitric acid in a second wet scrubbing unit with a second aqueous medium containing an alkaline earth compound, selected from the group consisting of calcium hydroxide and magnesium hydroxide, which reacts with nitric acid to form an alkaline earth nitrate;

separating said humidified gaseous stream from said second wet scrubbing unit and removing a second aqueous effluent containing an alkaline earth nitrate from said second wet scrubbing unit; and maintaining the first aqueous effluent from said first wet scrubbing unit separate from the second aqueous effluent from said second wet scrubbing unit during said removing steps.

7. A process for removing sulfur dioxide and $NO_x$ from a gaseous stream comprising:

contacting said gaseous stream in a first wet scrubbing unit with a first lime slurry, which reacts with sulfur dioxide to form calcium sulfite and humidifies said gaseous stream to substantial saturation;

separating said humidified gaseous stream from said first wet scrubbing unit and removing a first aqueous effluent containing said calcium sulfite from said first wet scrubbing unit;

exposing said separated humidified gaseous stream containing $NO_x$ to a coronal discharge to form nitric acid in said humidified gaseous stream;

contacting said humidified gaseous stream containing nitric acid in a second wet scrubbing unit with a second lime slurry which reacts with nitric acid to form calcium nitrate;

separating said humidified gaseous stream from said second wet scrubbing unit and removing a second aqueous effluent containing said calcium nitrate from said second wet scrubbing unit; and maintaining the first aqueous effluent from said first wet scrubbing unit separate from the second aqueous effluent from said second wet scrubbing unit during said removing steps.

8. A process for removing sulfur dioxide and $NO_x$ from a gaseous stream comprising:

contacting said gaseous stream in a first wet scrubbing unit with a first aqueous medium, containing magnesium hydroxide, which reacts with sulfur dioxide to form magnesium sulfite and humidifies said gaseous stream to substantial saturation;

separating said humidified gaseous stream from said first wet scrubbing unit and removing a first aqueous effluent containing said magnesium sulfite from said first wet scrubbing unit;

exposing said separated humidified gaseous stream containing $NO_x$ to a coronal discharge to form nitric acid in said humidified gaseous stream;

contacting said humidified gaseous stream containing nitric acid in a second wet scrubbing unit with a second aqueous medium containing magnesium hydroxide which reacts with nitric acid to form magnesium nitrate;

separating said humidified gaseous stream from said second wet scrubbing unit and removing a second aqueous effluent containing said magnesium nitrate from said second wet scrubbing unit; and maintaining the first aqueous effluent from said first wet scrubbing unit separate from the second aqueous effluent from said second wet scrubbing unit during said removing steps.

* * * * *